US007696758B2

(12) United States Patent
Chung et al.

(10) Patent No.: US 7,696,758 B2
(45) Date of Patent: Apr. 13, 2010

(54) PLASMA DIAGNOSTIC APPARATUS AND METHOD

(75) Inventors: Chin-Wook Chung, 102-1404, Hangang Kukdong Apt., Pungnap-dong, Songpa-gu, Seoul 138-784 (KR); Min-Hyung Lee, Seoul (KR); Sung-Ho Jang, Seoul (KR)

(73) Assignees: Korea Research Institute of Standards and Science (KR); Chin-Wook Chung (KR)

( * ) Notice: Subject to any disclaimer, the term of this patent is extended or adjusted under 35 U.S.C. 154(b) by 0 days.

(21) Appl. No.: 12/114,043

(22) Filed: May 2, 2008

(65) Prior Publication Data

US 2008/0265903 A1 Oct. 30, 2008

Related U.S. Application Data

(63) Continuation of application No. PCT/KR2006/003993, filed on Oct. 2, 2006.

(30) Foreign Application Priority Data

Nov. 4, 2005 (KR) ...................... 10-2005-0105335
Jun. 8, 2006 (KR) ...................... 10-2006-0051489

(51) Int. Cl.
*G01N 27/62* (2006.01)

(52) U.S. Cl. ......................... 324/464; 702/60; 455/410; 324/754; 156/345.24

(58) Field of Classification Search .................. 324/464
See application file for complete search history.

(56) References Cited

U.S. PATENT DOCUMENTS

| | | | | |
|---|---|---|---|---|
| 5,359,282 | A | 10/1994 | Teii et al. | 324/71 |
| 6,061,006 | A * | 5/2000 | Hopkins | 341/61 |
| 6,313,583 | B1 | 11/2001 | Arita et al. | 315/111 |
| 6,441,620 | B1 * | 8/2002 | Scanlan et al. | 324/459 |
| 6,771,481 | B2 | 8/2004 | Nishio et al. | 361/234 |
| 6,917,204 | B2 * | 7/2005 | Mitrovic et al. | 324/464 |
| 7,015,703 | B2 * | 3/2006 | Hopkins et al. | 324/655 |
| 2003/0215373 | A1 * | 11/2003 | Reyzelman et al. | 422/186.29 |
| 2004/0135627 | A1 * | 7/2004 | Yamazato et al. | 330/85 |
| 2007/0289359 | A1 * | 12/2007 | Shannon et al. | 73/23.2 |

OTHER PUBLICATIONS

International Search Report, Jan. 11, 2007, 2 pages.

* cited by examiner

*Primary Examiner*—Timothy J Dole
*Assistant Examiner*—Benjamin M Baldridge
(74) *Attorney, Agent, or Firm*—St. Onge Steward Johnston & Reens LLC

(57) ABSTRACT

Provided is a plasma diagnostic apparatus having a probe unit, which is inserted into a plasma or disposed at boundary of a plasma, the apparatus including: a signal supplying unit having a signal supplying source; a current detecting/voltage converting unit for applying a periodic voltage signal applied from the signal supplying unit to the probe unit, detecting the magnitude of the current flowing through the probe unit, and converting the detected current into a voltage; and a by-frequency measurement unit for computing the magnitude and phase of individual frequency components of the current flowing through the probe unit by receiving the voltage output from the current detecting/voltage converting unit as an input.

12 Claims, 8 Drawing Sheets

PLASMA DIAGNOSTIC APPARATUS AND METHOD

CROSS-REFERENCE TO RELATED APPLICATIONS

The present application is a continuation of pending International patent application PCT/KR2006/003993 filed on Oct. 2, 2006 which designates the United States and claims priority from Korean patent application 10 2006 0051489 filed on Jun. 8, 2006 and Korean patent application 10 2005 0105335 filed Nov. 4, 2005, the content of which is incorporated herein by reference.

FIELD OF THE INVENTION

The present invention relates to a plasma diagnostic apparatus, and more particularly, to apparatus and method that enables a rapid and precise measurement of plasma parameters including a plasma density, an electron temperature, a plasma potential, a floating potential, and the like by measuring an AC current generated from plasma in a plasma apparatus.

Also, the present invention relates to a plasma diagnostic apparatus that enables a precise separation of a frequency component using, for example, Fast Fourier Transform (FFT) or Phase Sensitive Detection (PSD), by a by-frequency measurement unit, which may be implemented using a hardware or software.

BACKGROUND OF THE INVENTION

Among equipments used to manufacture semiconductor devices, a plasma apparatus is widely used for forming plasma in a closed chamber of vacuum state, depositing a thin film on a wafer by injecting a reaction gas, and etching a thin film formed on a wafer.

The plasma apparatus has various advantages in that when the deposition process is performed using the plasma, the deposition process can be performed in a low temperature which does not allow impurities formed in the wafer to further diffuse, and the thickness uniformity of the thin film formed on a large-sized wafer is excellent, and that when the etch process is performed, the etch uniformity of the thin film across the wafer is excellent. Accordingly, the plasma apparatus is widely used.

A Langmuir probe is most widely used to measure plasma parameters in the plasma of a plasma apparatus and determine plasma characteristics and ion and electron distribution.

There are three types of Langmuir probes: a single Langmuir probe, a double Langmuir probe and a triple Langmuir probe. The Langmuir probe may be used to obtain a current-voltage characteristic curve of the plasma by inserting the probe made from metal in the plasma, applying a voltage to the probe, and measuring a current flowing through the probe.

For example, in the single probe, the current-voltage curve is expressed as Equation (1):

$$I_P = I^+ - I^- \exp\left[\frac{V_B - V_P}{T_e}\right], \tag{1}$$

where $I^+$, $I^-$, $V_B$, $V_P$ are an ion saturation current, an electron saturation current, a probe potential and a plasma potential respectively. That is, as the probe potential increases, the current flowing through the probe increases exponentially.

Also, in the double probe, the current-voltage curve is expressed as Equation (2):

$$I_P = I^+ \tanh\left(\frac{V_B}{2T_e}\right). \tag{2}$$

Data such as an ion saturation current, an electron saturation current, an electron temperature, a plasma potential, and the like can be obtained from each of the current-voltage characteristic curves. Such a method is simple, but it has an inconvenience in that the current-voltage curve must be obtained, and that a separate signal processing is required for obtaining this data.

Also, when an insulator layer is formed on the probe surface through the deposition in the plasma, the biggest problem is that the probes cannot operate correctly, whereby the current-voltage curve cannot be obtained. Further, it is the most important requirement that a measurement object in the plasma diagnostic not be influenced by any effects, such as perturbation. However, since many charges in the plasma are extracted, the object is influenced by perturbation. Furthermore, real-time plasma analysis is also difficult.

Meanwhile, while there have been various attempts to diagnose the plasma using the nonlinearity of a plasma sheath, such attempts have failed to obtain satisfactory results. There is a method for measuring an electron temperature approximately using the nonlinearity in a nuclear fusion plasma such as Tokamak.

The method is more specifically explained in below.

After floating the probe inserted into the plasma in a plasma chamber using a DC current blocking capacitor, if a sine-wave voltage is applied, the current flowing through the probe is expressed as Equation (3):

$$i_{pr} = i^+ - i^- \exp\left[(V_B - V_P)/T_e\right], \tag{3}$$

where $I_{pr}$ is a current flowing through the probe, $i^+$ and $i^-$ are an ion saturation current and an electron saturation current respectively, and $V_B$, $V_P$, and $T_e$ are a probe potential, a plasma potential and an electron temperature respectively.

$i^+$,$i^-$ are expressed as Equation (4) and Equation (5) respectively:

$$i^+ = 0.61 e\, n_i u_B A, \tag{4}$$

where, $n_i$ is an ion density, $U_B$ is a Bohm velocity, and A is a probe area. Further, e represents a charge of an electron, as is well known in the art.

$$i^- = \frac{1}{4} e n_e v_e A, \tag{5}$$

where $n_e$ is an ion density, and $V_e$ is an electron velocity.

Accordingly, if the probe potential($V_B$) is $V_B = \nabla + V_0 \cos wt$, the current flowing through the probe is expressed as Equation (6):

$$i_{pr} = i^+ - i^- \exp[(\bar{V} - V_P)/T_e] \exp\left[\frac{V_0}{T_e}\cos wt\right], \tag{6}$$

where $\nabla$ is a floating potential.

If the probe current($i_{pr}$) is expanded by a modified Bessel function. The result is expressed as Equation (7):

$$\begin{aligned} i_{pr} &= i^+ - i^- \exp[(\overline{V} - V_P)/T_e]\left[I_0\left(\frac{V_0}{T_e}\right) + 2\sum_{k=1}^{\infty} I_k\left(\frac{V_0}{T_e}\right)\cos(k\omega t)\right] \\ &= i^+ - i^- \exp[(\overline{V} - V_P)/T_e]\left(I_0\left(\frac{V_0}{T_e}\right)\right) - \\ &\quad i^- \exp[(\overline{V} - V_P)/T_e]\left[2\sum_{k=1}^{\infty} I_k\left(\frac{V_0}{T_e}\right)\cos(k\omega t)\right] \\ &= i_{DC} + i_{AC} \end{aligned} \tag{7}$$

As shown by Equation (7), the probe current($i_{pr}$) consists of a DC current and an AC current.

As described later, if the probe is connected to the DC current blocking capacitor according to this invention, the DC current cannot flow.

Accordingly, the DC current($i_{DC}$) of the probe current($i_{pr}$) is expressed as Equation (8):

$$i_{DC} = i - i^- \exp[(\overline{V} - V_p)/T_e]\left(I_0\left(\frac{V_0}{T_e}\right)\right) = 0. \tag{8}$$

Also, log is applied to Equation (8) and the result is obtained as Equation (9):

$$\frac{(\overline{V} - V_p)}{T_e} + \log\left(I_0\left(\frac{V_0}{T_e}\right)\right) = \log\left(\frac{I^+}{I^-}\right). \tag{9}$$

The floating potential is the potential between capacitors, and the plasma potential may be obtained from Equation (9) using the floating potential and the electron temperature. Also, the floating potential varies with $V_0$, accordingly, after obtaining the floating potential variation ($\Delta\overline{V}$) with $V_0$ changes, the electron temperature may be obtained using Equation (9). An approximate calculation equation is expressed as Equation (10):

$$T_e = -\frac{1}{4}\frac{V_0^2}{\Delta\overline{V}}, \tag{10}$$

where $\Delta\overline{V}$ is a floating potential variation.

The AC current is expressed as Equation (11):

$$\begin{aligned} i_{AC} &= -i^- \exp[(\overline{V} - V_P)/T_e]\left(2\sum_{k=1}^{\infty} I_k\left(\frac{V_0}{T_e}\right)\cos(k\omega t) + \ldots\right) = \\ &\quad -2i^- \exp[(\overline{V} - V_P)/T_e] \\ &\quad \left[I_1\left(\frac{V_0}{T_e}\right)\cos(\omega t) + I_2\left(\frac{V_0}{T_e}\right)\cos(2\omega t) + I_3\left(\frac{V_0}{T_e}\right)\cos(3\omega t) + \ldots\right] = \\ &\quad -2i^- \exp[(\overline{V} - V_P)/T_e][i_{\omega} + i_{2\omega} + i_{3\omega} + \ldots] \end{aligned} \tag{11}$$

Therefore, by comparing between the magnitudes of ω and 2 ω frequency components of the probe current, the result of the comparison is obtained as Equation (12):

$$\frac{i_{\omega}}{i_{2\omega}} = \frac{I_1(V_0/T_e)}{I_2(V_0/T_e)} \approx \frac{4T_e}{V_0} \text{ (when } V_0 < T_e), \tag{12}$$

such that after measuring the magnitudes of ω and 2 ω frequency components, the electron temperature is obtained from Equation (12).

In such a method, in order to measure the electron temperature precisely, it is most important to precisely measure the magnitudes of individual frequency components of the probe current.

Conventionally, after converting a current signal into a voltage signal using a current probe (transformer), two frequency components of the current are obtained using ω and 2 ω Notch filters.

SUMMARY OF THE INVENTION

The method as described above is suitable for a large flowing current such as in Tokamak. But the current flow in the plasma chamber used in a semiconductor process and so on is less than one-hundredth that in Tokamak, such that there is a problem that precise current measurement cannot be made.

Also, when the current is separated into frequency components, because ω and 2 ω are very close in frequency, it is difficult to separate the current into ω and 2 ω.

Specifically, in a nuclear fusion such as Tokamak, an electron temperature is above than about 100 eV, such that ±5 error range is not a problem. But, in a process plasma, an electron temperature is 5 eV at most, such that the method cannot be applied.

Accordingly, It is an object of the present invention is to provide a plasma diagnostic apparatus for precisely detecting magnitudes of frequency components of the small current flowing through a probe in order to measure an electron temperature in a plasma.

It is another object of the present invention is to provide a plasma diagnostic apparatus for separating spurious signal components from individual frequency components.

It is a further object of the present invention is to provide a plasma diagnostic apparatus for providing an ion density as plasma parameter for a plasma diagnostic.

It is a further object of the present invention is to provide a plasma diagnostic apparatus for compensating the effect of a sheath impedance and measuring an electron temperature and an ion density precisely.

It is a further object of the present invention is to provide a plasma diagnostic apparatus for enabling fast measurements of plasma parameters in a plasma apparatus and monitoring a plasma in real-time.

The above objects and other advantages of the present invention will become more apparent by describing in detail preferred embodiments thereof with reference to the attached drawings.

To achieve these objects, the present invention provides a plasma diagnostic apparatus including a probe unit, which is inserted into a plasma or disposed at boundary of a plasma. The plasma diagnostic apparatus may include: (i) a signal supplying unit having a signal supplying source, (ii) a current detecting/voltage converting unit for applying a periodic voltage signal applied from the signal supplying unit to the probe unit, detecting the magnitude of the current flowing through the probe unit, and converting the detected current into a voltage, and (iii) a by-frequency measurement unit for computing the magnitude and phase of individual frequency components of the current flowing through the probe unit by receiving a voltage output from the current detecting/voltage converting unit as an input.

Preferably, The plasma diagnostic apparatus may further include another probe unit connected to the signal supplying unit and inserted into the plasma.

Also, the current detecting/voltage converting unit may further include a current detecting resistor connected to the rear end of the probe unit in series, and a differential amplifier for measuring a electric potential difference across the current detecting resistor, and computing the magnitude of the current flowing through the probe unit.

Preferably, the signal supplying unit may further include a signal amplifier having one input terminal connected to the signal supplying source, the other input terminal connected to the rear end or the front end of the current detecting resistor, and an output terminal connected to the rear end of the current detecting resistor.

Preferably, the by-frequency measurement unit may use FFT.

Preferably, the by-frequency measurement unit may include a operation circuit unit for performing a predetermined operation by receiving a voltage output from the current detecting/voltage converting unit and the periodic voltage signal as inputs, and a low pass filter unit for computing magnitudes of individual frequency components of the current flowing the probe by low pass filtering the operation result of the operation circuit unit.

Preferably, capacitive means for DC current blocking may be disposed at least one of between the plasma and the probe unit, the probe unit and the current detecting/voltage converting unit, or the current detecting/voltage converting unit and the signal supplying unit.

The magnitude of the periodic voltage signal applied from the signal supplying unit to the probe unit is compensated by Equation (13), and applied to the plasma. Equation (13) is expressed as follows:

$$V_{sh}=R_{sh}V_0/(R_s+R_{sh}), \tag{13}$$

where $R_{sh}$, sheath resistance, is a function of an ion density and an electron temperature, $V_0$ is the magnitude of a periodic voltage signal applied to a probe unit, and Rs is a resistance of the circuit and the device connected to a probe unit.

Also, the electron temperature may be measured through a floating potential change between whether or not the signal supplying unit applies an electric signal.

Preferably, the ion density($n_i$) may be computed from the computed individual frequency components by using Equation (14). Equation (14) is expressed as follows:

$$n_i = \frac{2i_{k,\omega}I_0\left(\frac{V_{sh}}{T_e}\right)}{0.61eu_BAI_k\left(\frac{V_{sh}}{T_e}\right)}, \tag{14}$$

where $T_e$ is an electron temperature, $V_{sh}$ is the magnitude of the sheath voltage between a probe unit and a plasma, A is a probe area, and $i_{kw}$ is a magnitude of $k_{th}$ harmonic frequency of the current flowing through a probe unit.

To achieve these objects, there is provided a plasma diagnostic method, the method may include the steps of: applying a periodic voltage signal from a signal supplying unit to a probe unit inserted into a plasma, outputting a converted voltage after detecting the magnitude of the current flowing through the probe unit and converting the detected magnitude into a voltage, and computing the magnitude and phase of individual frequency components of the current flowing through the probe unit by receiving the output voltage as an input.

Preferably, computing the magnitude and phase of individual frequency components may be performed using either FFT or PSD.

According to the present invention, there are advantages as follows: even when the current flowing through the probe is small, magnitudes of individual frequency components of the current may be precisely measured; the frequency components of the current flowing through the probe may be separated by detecting the frequency components through the digital signal processing, and because of the digital signal processing, the frequency components may be precisely separated even when the difference of frequency components is very small, the ability to withstand noise is considerably enhanced; because of the fast signal processing speed, the fast measurements of plasma parameters and the real-time monitor of the plasma may be possible; even when a gas is deposited on the probe surface, plasma parameters may be measured.

DETAILED DESCRIPTION OF THE INVENTION

Now, a plasma diagnostic apparatus according to one preferred embodiment of the present invention will be described in detail with reference to the accompanying drawings.

Figure 1:
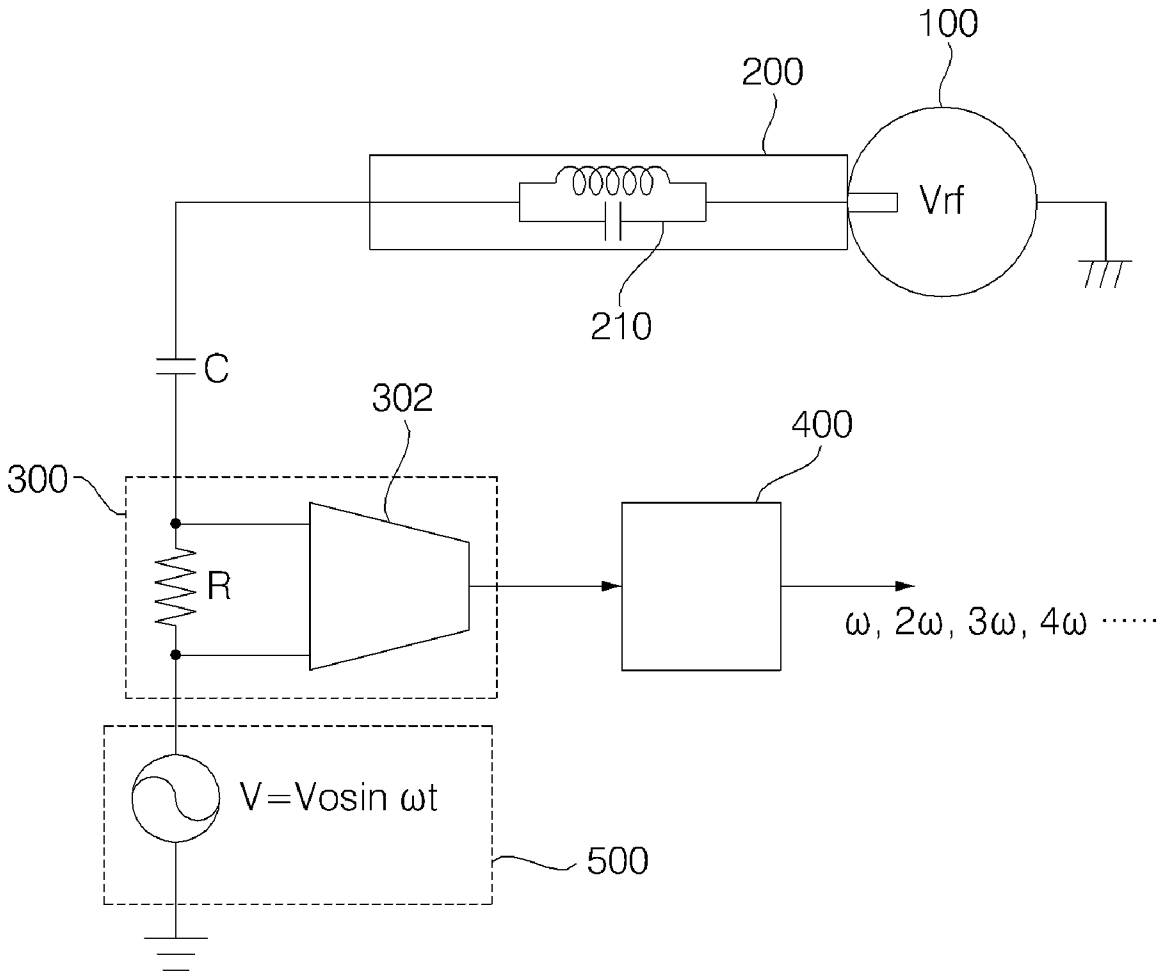
FIG. 1 is a schematic circuit diagram showing a plasma diagnostic apparatus according to an embodiment of the present invention.

FIG. 1 is a schematic circuit diagram showing a plasma diagnostic apparatus according to one preferred embodiment of the present invention.

(1) Probe Unit 200 and DC Current Blocking Capacitor

A choke box 210 may be selectively built-in in a probe unit 200. The choke box 210 is designed to include an LC resonant circuit having a capacitor and an inductor connected in parallel, and function to increase an impedance, thus reducing a potential difference between a probe and a plasma.

Thus, a probe potential is made to oscillate equally to a RF component of a plasma potential, which reduces an RF component current flowing through the probe unit 200 and prevents a floating potential from changing due to the RF component. As a result, the current signal flowing through the probe unit 200 can be prevented from being distorted.

Referring to FIG. 1, a DC current blocking capacitor C is installed at a rear end of the probe unit 200 to block a DC current. Unlike in the FIG. 1, the blocking capacitor C may be disposed at between the probe unit 200 and the plasma, or a current detecting resistor R and a signal supplying source V of a signal supplying unit 500. Also, as described later, the diagnostic apparatus of FIG. 1 may be used without the DC current blocking capacitor C, and a voltage source may be installed to adjust an applying voltage and measure a DC current signal. The signal supplying unit 500 can comprise more than two signal supplying sources and a chopping wave, a square wave or a saw tooth wave comprising harmonic frequencies components can be applied instead of a sine wave V. Also, without the DC current blocking capacitor C, a probe of the probe unit 200 may perform a function as capacitor for DC current blocking by forming an insulation film on the probe.

(2) Current Detecting/Voltage Converting Unit 300

Because the current flowing through the probe unit 200 has density and temperature data, the magnitude of the current is precisely measured and converted into a voltage signal of the same frequency.

In this embodiment, the current detecting resistor R having a given resistance is connected to the rear end of the probe unit 200 in series to generate a potential difference across the current detecting resistor R in proportion to the magnitude of the current flowing through the probe unit 200. The magnitude of the current flowing through the probe unit 200 may be known from a potential difference measured using a differential amplifier 302.

Then, while the magnitude of the current flowing through the probe unit 200 is even small, the magnitude may be precisely measured by choosing a differential amplifier having an appropriate resistor and bandwidth.

Such the measured current magnitude is converted into a voltage Vout and output.

The current detecting resistor R and the differential amplifier 302 are used in this embodiment, on the other hand a current probe measuring a current may be used.

(3) By-Frequency Measurement Unit 400

A by-frequency measurement unit 400 serves to separate the voltage Vout output from the current detecting/voltage converting unit 300 into frequency components. For example, the by-frequency measurement unit 400 may use an FFT.

Like this, by using an FFT or a PSD instead of a conventional analog filter, a probe vibration frequency can be precisely separated into individual frequency components such as ω, 2ω and harmonic frequencies. Also, since the FET or PDS processes digital signals, it has superior performance against noise environment.

On the other hand, according to the present invention, an ion density may be computed from the magnitude of ω component of the measured current, and provided as a plasma parameter for plasma diagnostic additionally.

More specifically, when the DC current blocking capacitor C is inserted, the DC current should be 0. Accordingly, Equation (15) is obtained from the Equation (8). Equation (15) is expressed as follows:

$$i^{+} = i^{-}\exp[(\overline{V} - V_p)/T_e]\left(I_0\left(\frac{V_0}{T_e}\right)\right). \tag{15}$$

Representatively the current magnitude $i_w$ of a first frequency component ω is expressed as Equation (16):

$$\begin{aligned} i_\omega &= -2i^{-}\exp[(\overline{V} - V_P)/T_e]I_1(V_0/T_e) \\ &= -2i^{+}\frac{I_1(V_0/T_e)}{I_0(V_0/T_e)} \\ &\approx -i^{+}\left(\frac{V_0}{T_e}\right) \\ &\approx -0.61\, e n_i u_B A\left(\frac{V_0}{T_e}\right) \end{aligned} \tag{16}$$

Thus, the ion density $n_i$ is approximately expressed as Equation (17):

$$n_i \approx \frac{i_\omega T_e}{0.61 e u_B A V_0} \tag{17}$$

According to the present invention, it is necessary to know the potential difference precisely across the probe sheath in order to enable precise measurements of the electron temperature and ion density.

When the ion density is high, there is a problem in measurement precision; when the signal supplying unit 500 applies an AC voltage having an amplitude $V_o$, as the voltage $V_o$ is distributed to the current detecting resistor or the choke box, a small voltage than the voltage $V_o$ is applied to across the sheath, such that the measured electron temperature and ion density become inaccurate.

Therefore, in order to enable precise measurements of the electron temperature and ion density, the effect of voltage distribution should be calculated after calculating a sheath resistance. The sheath resistance $R_{sh}$ is a function of the ion density and electron temperature, and thereby is expressed as Equation (18):

$$R_{sh} = T_e/(0.61 e^2 n_i u_B A) \tag{18}$$

Accordingly, when the voltage $V_0$ is applied from the signal supplying unit 500, the voltage $V_{sh}$ across the sheath is expressed as follows:

$$V_{sh} = R_{sh} V_0/(R_s + R_{sh}) \tag{19}$$

The $V_{sh}$ should be substituted to the equations which obtain the density and temperature. Where, $R_s$ is the impedance of equipments and circuit elements such as the current detecting resistor R and the choke box connected to the probe.

Figure 8:
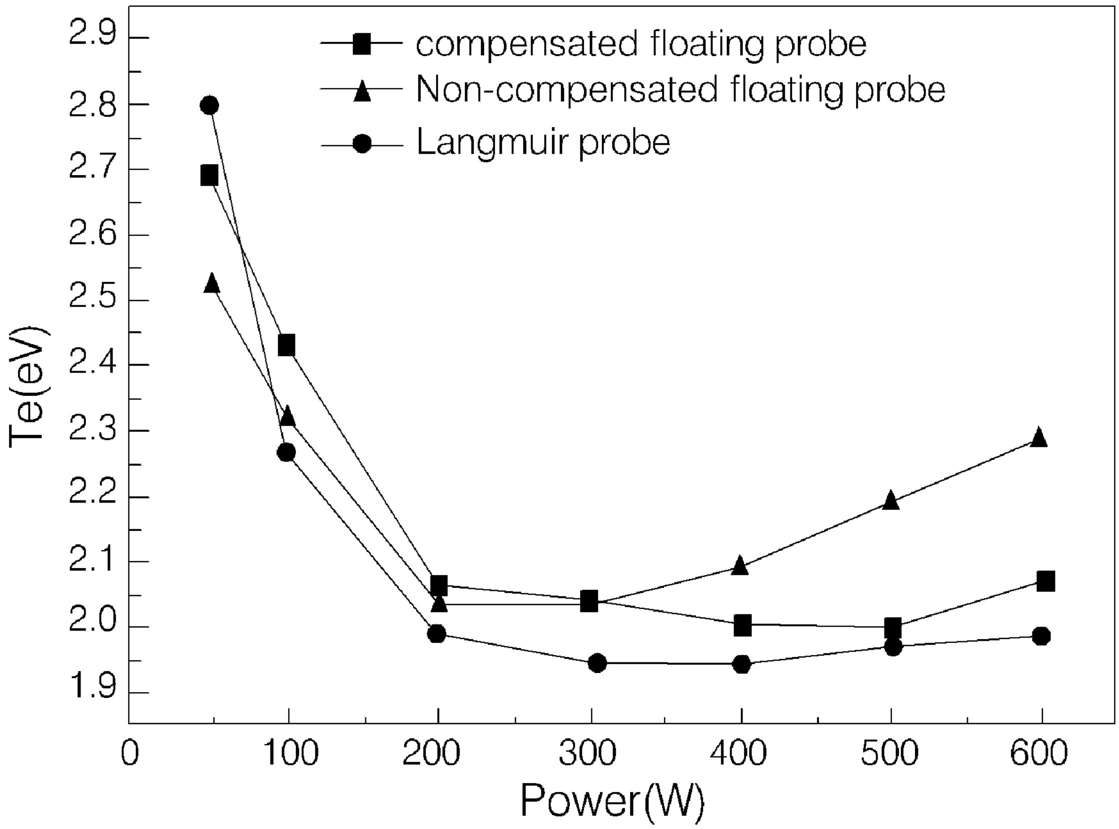
FIG. 8 is a graph showing results using and not using a voltage distribution algorithm in order to enhance a measurement precision of an ion density and an electron temperature in the present invention.

As described above, the measurement precision may be significantly improved by compensating the effect of the voltage distribution (refer to FIG. 8).

EXPERIMENTAL EXAMPLE 1

Figure 2:
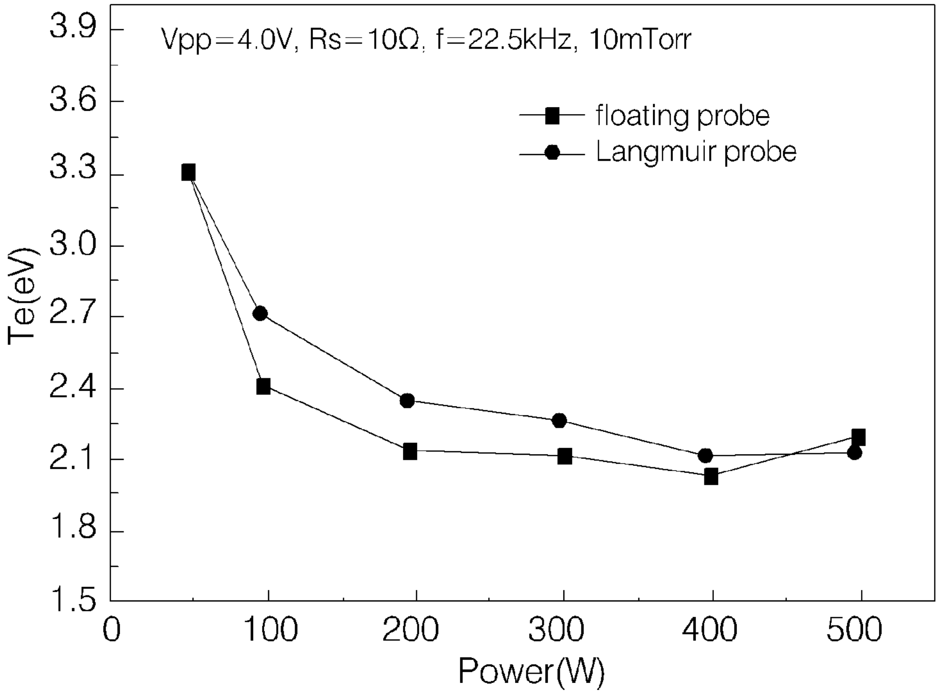
FIG. 2 and FIG. 3 are graphs comparing electron temperatures and ion densities respectively measured using a floating probe according to the present invention and the well-known single Langmuir probe in an argon gas atmosphere at a pressure of 10 mTorr.
Figure 3:
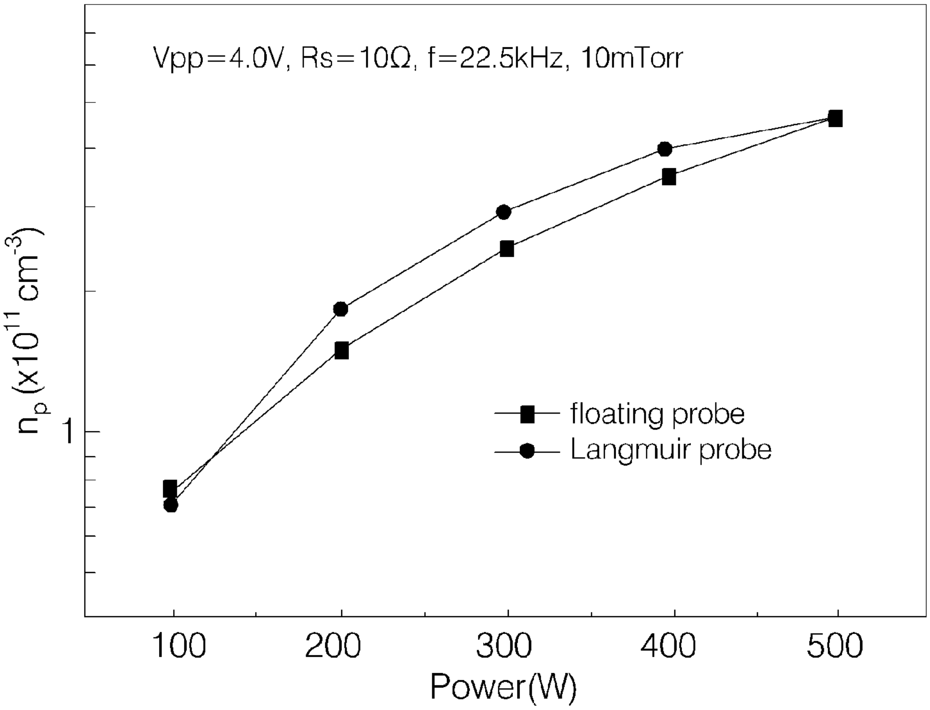

FIG. 2 and FIG. 3 are graphs comparing electron temperatures and ion densities respectively measured using a floating probe according to the present invention and the well-known single Langmuir probe in an argon gas atmosphere at a pressure of 10 mTorr.

As shown in the graphs, the results measured using the floating probe according to the present invention correspond to the results measured using the Langmuir probe in the input power region, accordingly this shows that the results measured using the floating probe according to the present invention are very reliable.

EXPERIMENTAL EXAMPLE 2

Figure 4:
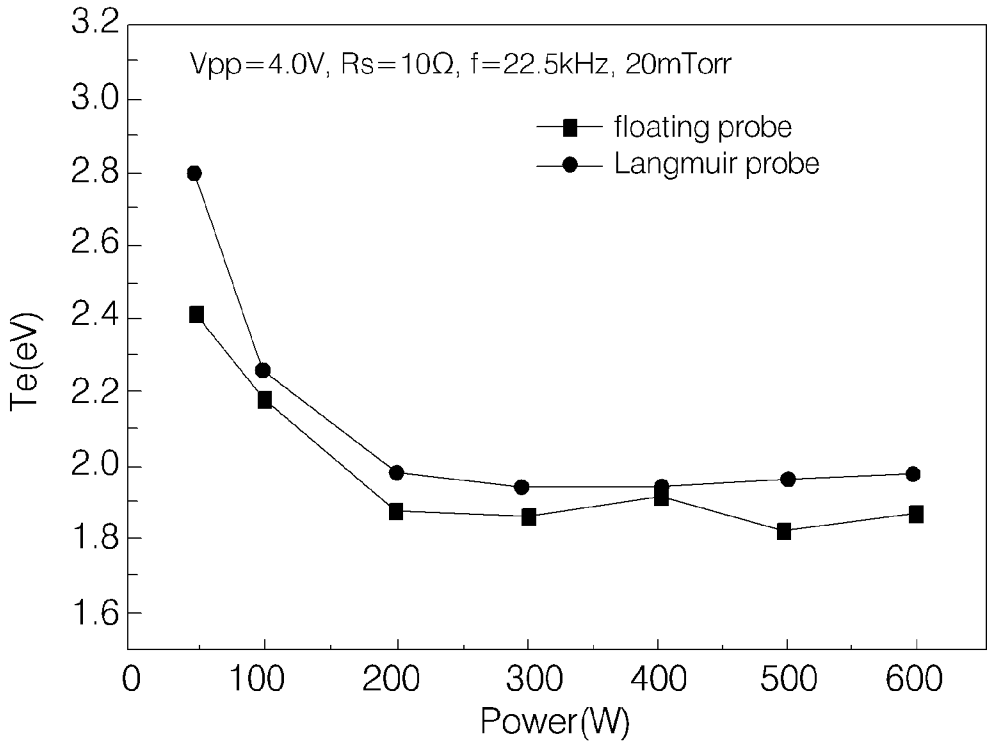
FIG. 4 and FIG. 5 are graphs comparing electron temperatures and ion densities respectively measured using a floating probe according to the present invention and the well-known single Langmuir probe in an argon gas atmosphere at a pressure of 20 mTorr.
Figure 5:
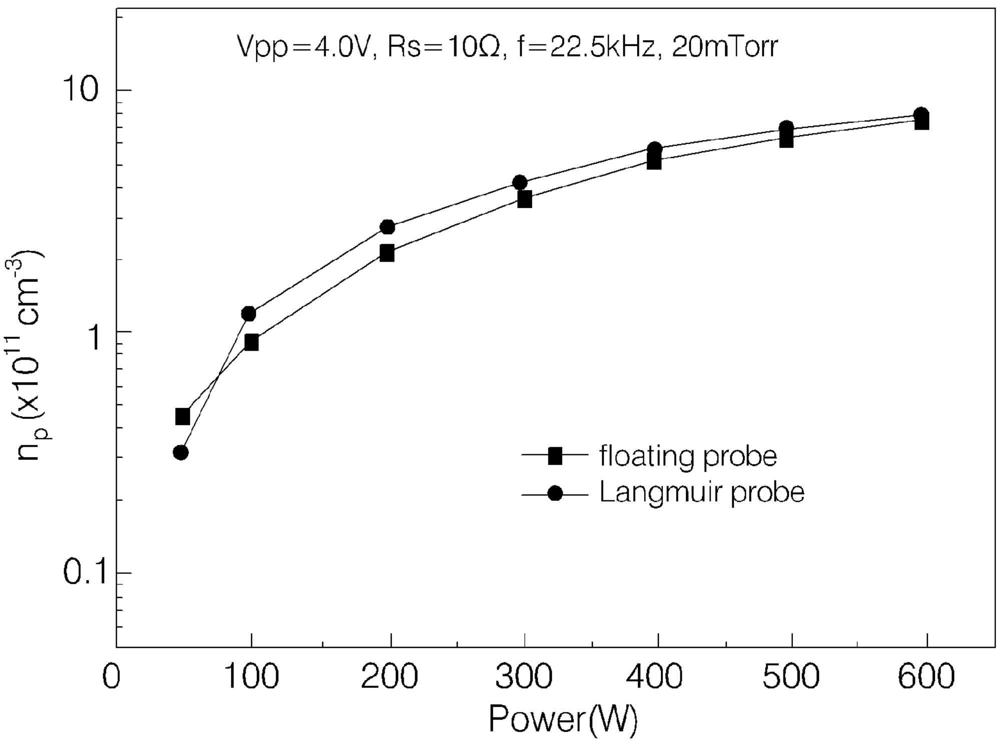

Also, FIG. 4 and FIG. 5 are graphs comparing electron temperatures and ion densities respectively measured using the floating probe according to the present invention and the well-known single Langmuir probe in an argon gas atmosphere at a pressure of 20 mTorr.

As shown in the graphs, the results measured using the floating probe according to the present invention also correspond to the results measured using the Langmuir probe in the input power region, accordingly this also shows that the results measured using the floating probe according to the present invention are very reliable.

EXPERIMENTAL EXAMPLE 3

Figure 6:
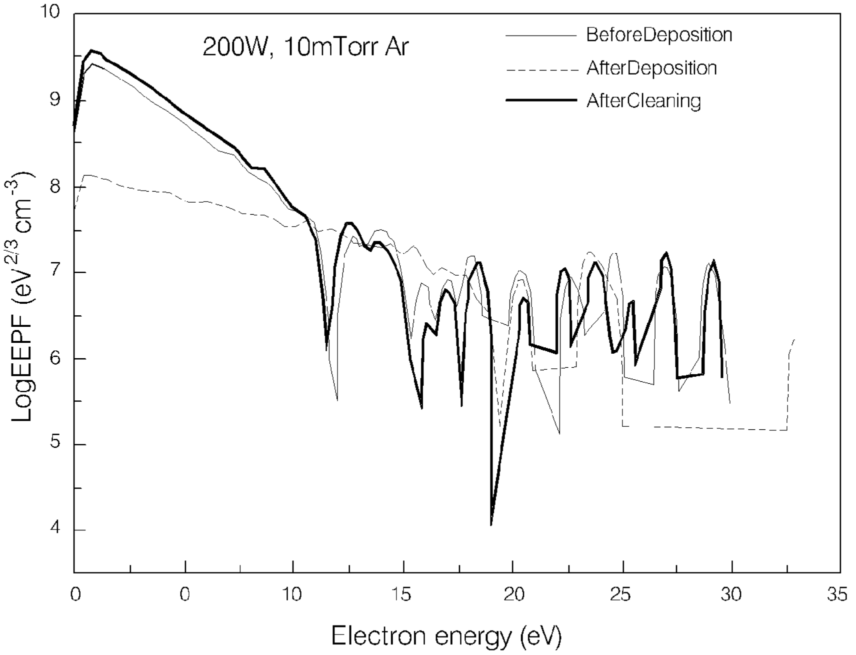
FIG. 6 and FIG. 7 are graphs showing results measured using the well-known Langmuir probe and a floating probe according to the present invention respectively after mixing an argon gas and a $CF_4$ gas used in actual semiconductor process in the ratio of 8:2.
Figure 7:
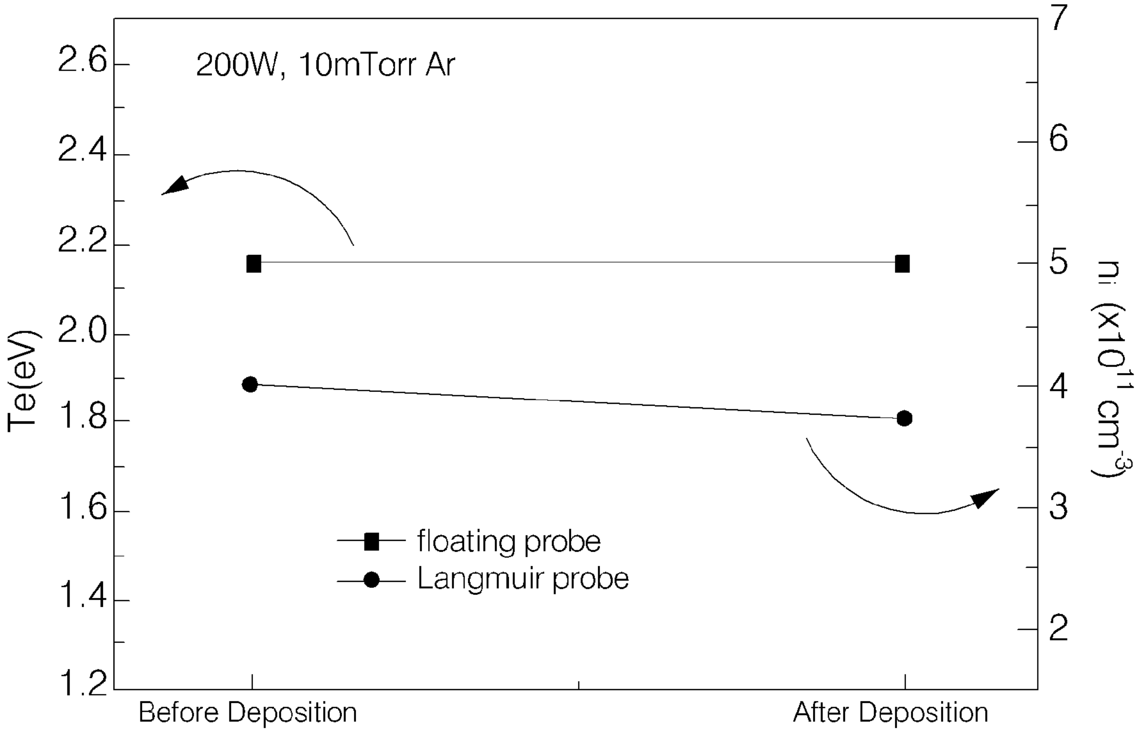

FIG. 6 and FIG. 7 are graphs showing results measured using the well-known Langmuir probe and the floating probe according to the present invention respectively after mixing an argon gas and a $CF_4$ gas used in actual semiconductor process in the ratio of 8:2.

Referring to FIG. 6, as the Langmuir probe measures the conduction current of an ion or an electron directly, when an insulation layer is deposited on the surface of the Langmuir probe through the $CF_4$ plasma, the Langmuir probe cannot measure. Therefore, the Langmuir probe may not be used for plasma diagnostic in a substantial mixture gas(refer to the red graph in FIG. 6).

On the other hand, Referring FIG. 7, as the floating probe according to the present invention measures AC current, though the insulation layer is deposited to some degree on the surface of the floating probe through the $CF_4$ plasma, the insulation layer may not significantly affect the measurement result of the ion density or electron temperature.

Now referring FIG. 8, when a voltage distribution algorithm is added in the present invention in order to enhance the precision of plasma diagnostic, the measurement precision is significantly improved.

Figure 9:
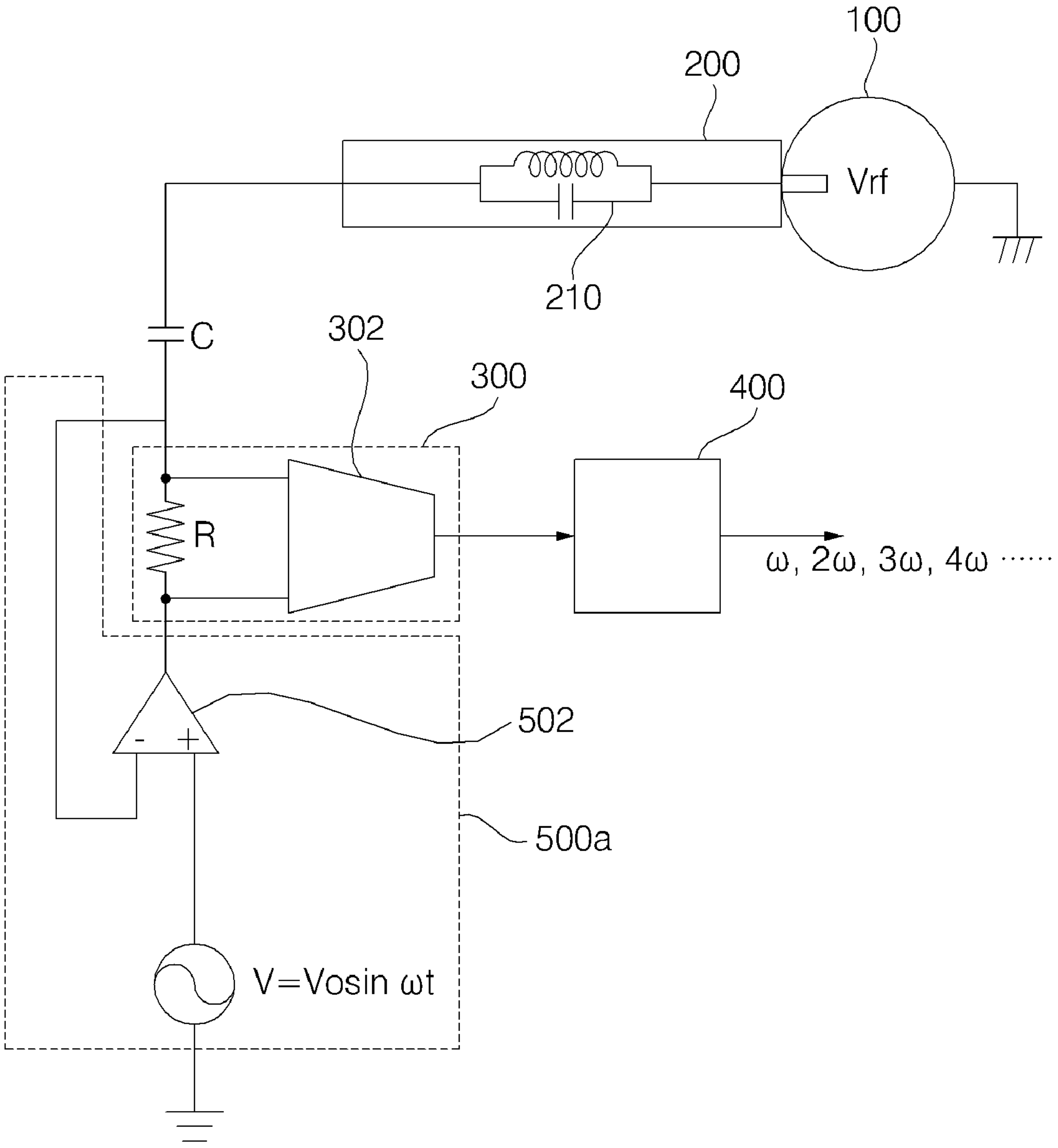
FIG. 9 is a schematic circuit diagram showing a plasma diagnostic apparatus according to another embodiment of the present invention.

FIG. 9 is a schematic circuit diagram showing a plasma diagnostic apparatus according to another embodiment of the present invention.

According to the embodiment, a signal supplying unit 500*a* may further include a signal amplifier 502 having an input terminal connected to the signal supplying source V, a feedback terminal connected to the front end of the resistor R in the current detecting/voltage converting unit 300, and an output terminal connected to the rear end of the resistor R.

According to the embodiment, a voltage drop does not occur in the resistor R such that an applied voltage may be almost equal to a sheath voltage. Accordingly, there is an advantage that the voltage distribution problem may be solved without compensating the effect of the sheath impedance.

While the feedback terminal in the embodiment is connected to the front end of the resistor R in the current detecting/voltage converting unit 300, the feedback terminal may be connected to the rear end of the resistor R.

Figure 11:
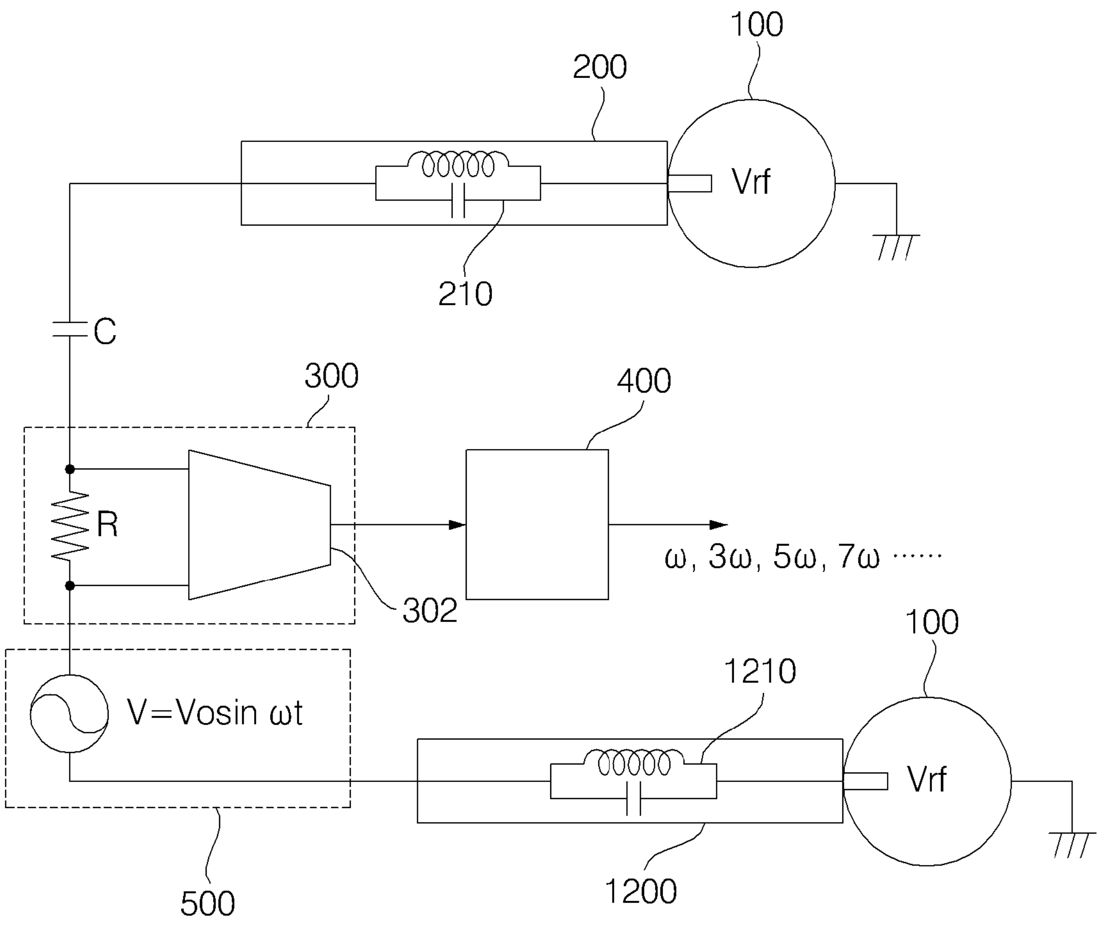
FIG. 11 is a schematic circuit diagram showing a plasma diagnostic apparatus according to a still further embodiment of the present invention.

FIG. 11 is a schematic circuit diagram showing a plasma diagnostic apparatus according to a still further embodiment of the present invention, which may be configured to have two probe units 200, 1200 inserted a plasma. Then, an plasma density and an electron temperature may be obtained using the harmonic frequency components of a current flowing between the probes by applying a periodic voltage signal between the probes. There is a advantage that the DC current blocking capacitor may be not required in such an embodiment.

The current flowing between the probes is expressed as above:

$$I_p = I^+ \tan h(V_B/T_e). \quad (20)$$

When a periodic signal $v/2T_e<1$ is applied to $V_B=v(t)$ in Equation (20), high frequency components are obtained as follows:

$$I_w = I^+\left(\frac{v}{2T_e}\right),\ I_{3w} = \frac{I^+}{12}\left(\frac{v}{2T_e}\right)^3. \quad (21)$$

Accordingly, $n_i$ and $T_e$ may be obtained using Equation (21) as follows:

$$n_i = \frac{I_w}{0.61 e u_B A_p}\left(\frac{2T_e}{v}\right),\ T_e = \frac{v}{24}\left(\frac{I_w}{I_{3w}}\right). \quad (22)$$

In this embodiment, the current circularly flows between the probes, and thus a floating is automatically achieved. Therefore, this embodiment has an advantage that the DC current blocking capacitor is not required separately.

Figure 10:
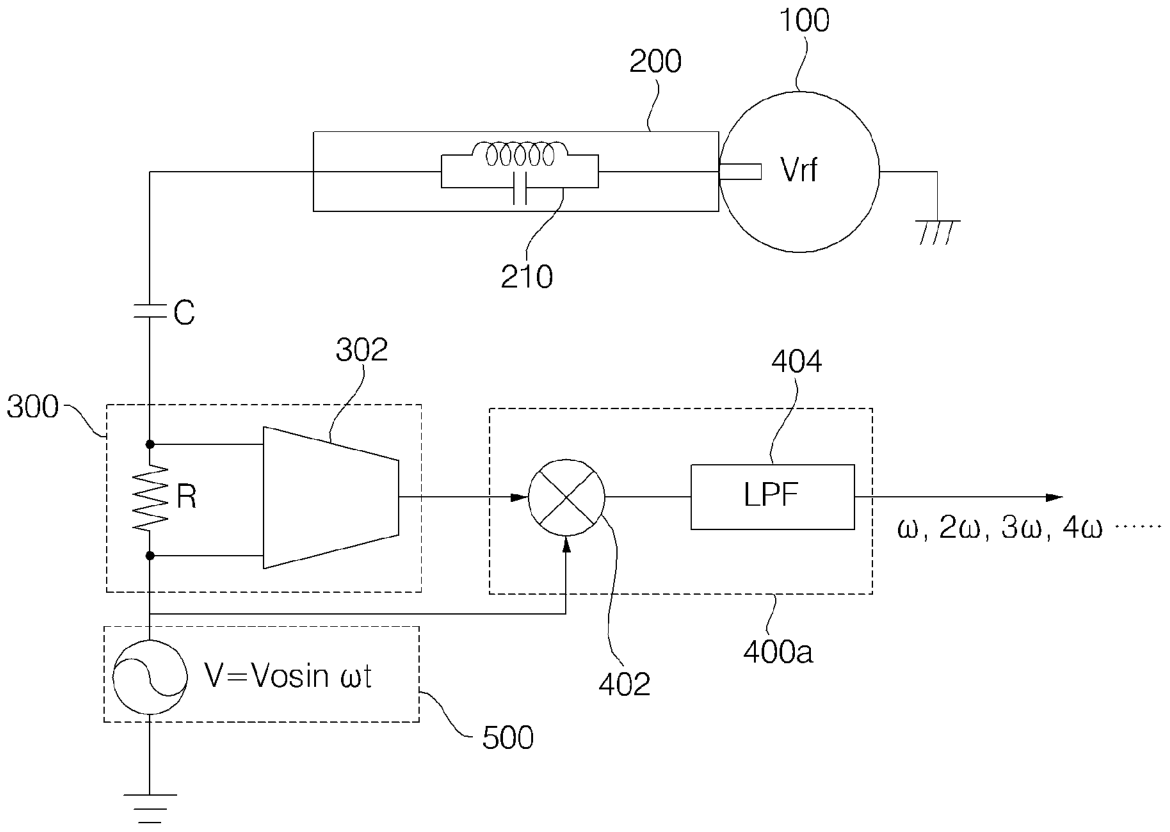
FIG. 10 is a schematic circuit diagram showing a plasma diagnostic apparatus according to a further embodiment of the present invention.

FIG. 10 is a schematic circuit diagram showing a plasma diagnostic apparatus according to a further embodiment of the present invention.

Referring to FIG. 10, a by-frequency measurement unit 400*a* includes an operating circuit unit 402 and a low pass filter unit 404, and use PSD method which is well-known method.

An input signal of the operation circuit unit 402 is an output signal from the amplifier 302 of the current detecting/voltage converting unit 300, or TTL signal converted from the output signal.

When an input signal and a current signal are expressed as follows respectively:

$$V_R(t) = V_R\cos(w_R t + \Phi_R),$$

$$I_s(t) = I_{1s}\cos(w_S t + \Phi_S) + I_{2S}\cos(w_{2S} t + \Phi_{2S}) + \ldots, \quad (23)$$

for example if the operation circuit unit 402 performs multiplication, the result is expressed as follows:

$$I_S(t)V_R(t) = I_{1S}V_R\cos(w_R t + \Phi_R)\cos(w_S t + \Phi_S) + \ldots\ I_S(t)V_R(t) = \frac{I_{1S}V_R}{2}(\cos[(w_S - w_R)t + \Phi_S - \Phi_R] + \cos[(w_S + w_R)t + \Phi_S + \Phi_R]) + \ldots \quad (24)$$

where $w_R$ equals to $w_S$. If $I_S(t)V_R(t)$ passes through a lowpass filter, only $$\frac{I_{1S}V_R}{2}\cos(\Phi_S - \Phi_R)$$

remains. Accordingly, the phase angle and amplitude of a reference signal are known, a current of 1 ω frequency component may be measured. Similarly, a harmonic frequency or frequency multiplication may be applied to the operation circuit unit 402 to measure the phase angle and amplitude of high frequency component such as 2 ω, 3 ω, and the like.

While the present invention has been described and illustrated herein with reference to the preferred embodiments thereof, it will be apparent to those skilled in the art that various modifications and variations can be made therein without departing from the spirit and scope of the invention.

Thus, It is intended that the scope of the invention is defined not by the preferred embodiments description of the invention but by the appended claims.

What is claimed is:

1. A plasma diagnostic apparatus including a probe unit inserted into a plasma or disposed at a boundary of a plasma, the apparatus comprising:

a signal supplying unit having a signal supplying source;

a current detecting/voltage converting unit for applying a periodic voltage signal applied from the signal supplying unit to the probe unit, detecting the magnitude of the current flowing through the probe unit, and converting the detected current into a voltage; and a by-frequency measurement unit for receiving the voltage output from the current detecting/voltage converting unit as an input and computing the magnitude of individual frequency components of the current flowing through the probe unit;

wherein an ion density (ni) of the plasma is computed from the computed individual frequency components of the current by following Equation:

$$n_i = \frac{2 i_{k,w} I_0\left(\frac{V_{sh}}{T_e}\right)}{0.61 e u_B A I_k\left(\frac{V_{sh}}{T_e}\right)}$$

where Te is an electron temperature, Vsh is the magnitude of the sheath voltage between a probe unit and a plasma, A is a probe area, and ikw is a magnitude of kth harmonic frequency of the current flowing through a probe unit.

2. The plasma diagnostic apparatus of claim 1, further comprising:

another probe unit connected to the signal supplying unit and inserted into the plasma.

3. The plasma diagnostic apparatus of claim 1, wherein the current detecting/voltage converting unit comprises a current detecting resistor connected to a rear end of the probe unit in series, and a differential amplifier for measuring a electric potential difference between both ends of the current detecting resistor, and computing the magnitude of the current flowing through the probe unit.

4. The plasma diagnostic apparatus of claim 1, wherein the signal supplying unit further comprises a signal amplifier having one input terminal connected to the signal supplying source, the other input terminal connected to a first end or a second end of the current detecting resistor, and an output terminal connected to the second end of the current detecting resistor.

5. The plasma diagnostic apparatus of claim 1, wherein the by-frequency measurement unit uses FFT.

6. The plasma diagnostic apparatus of claim 1, wherein the by-frequency measurement unit comprises an operation circuit unit for receiving a voltage output from the current detecting/voltage converting unit and the periodic voltage signal as inputs and performing a preset operation; and a low pass filter unit for low pass filtering the operation result of the operation circuit unit and computing magnitudes of individual frequency components of the current flowing through the probe.

7. The plasma diagnostic apparatus of claim 1, wherein capacitive means for DC current blocking is disposed at least one of between the plasma and the probe unit, between the probe unit and the current detecting/voltage converting unit, and between the current detecting/voltage converting unit and the signal supplying unit.

8. The plasma diagnostic apparatus of claim 1, wherein the magnitude of the periodic voltage signal applied from the signal supplying unit to the probe unit is corrected by following Equation, and applied to the plasma.

$$V_{sh} = R_{sh} V_0 / (R_s + R_{sh})$$

where Rsh, is a sheath resistance as a function of an ion density and an electron temperature, $V_0$ is a magnitude of the periodic voltage signal applied to a probe unit, and Rs is a resistance of the circuit and the device connected to the probe unit.

9. The plasma diagnostic apparatus of claim 1, wherein an electron temperature is measured by calculating a change in a floating potential due to the change in the magnitude of the periodic voltage signal applied by the signal supplying unit.

10. A method of diagnosing a plasma, comprising:

applying a periodic voltage signal from a signal supplying unit to a probe unit inserted into a plasma;

detecting the magnitude of a current flowing through the probe unit, converting the detected current into a voltage and outputting the converted voltage;

receiving the output voltage as an input and computing the magnitudes and phases of individual frequency components of the current flowing through the probe unit;

obtaining an electron temperature at a high speed and in real-time using the ratio of the computed individual frequency components; and computing an ion density (ni) of a plasma from the computed individual frequency components of the current using following Equation:

$$n_i = \frac{2 i_{k,w} I_0\left(\frac{V_{sh}}{T_e}\right)}{0.61 e u_B A I_k\left(\frac{V_{sh}}{T_e}\right)}$$

where Te is an electron temperature, Vsh is the magnitude of the sheath voltage between a probe unit and a plasma, A is a probe area, and ikw is a magnitude of kth harmonic frequency of the current flowing through a probe unit.

11. The method of claim 10, wherein the computing of the magnitudes and phases of individual frequency components is performed using either FFT or PSD.

12. The method of claim 10, wherein the magnitude of a periodic voltage signal applied to the probe unit is corrected by following Equation, and applied to the plasma.

$$V_{sh} = R_{sh} V_0 / (R_s + R_{sh})$$

where Rsh, is a sheath resistance as a function of an ion density and an electron temperature, V0 is a magnitude of the periodic voltage signal applied to a probe unit, and Rs is a resistance of a circuit and devices connected to the probe unit.

* * * * *